Dec. 3, 1940.  H. A. NIETFELD  2,223,698
AUTOMATIC AIRPLANE WING CONTROL
Filed March 8, 1939  2 Sheets-Sheet 1
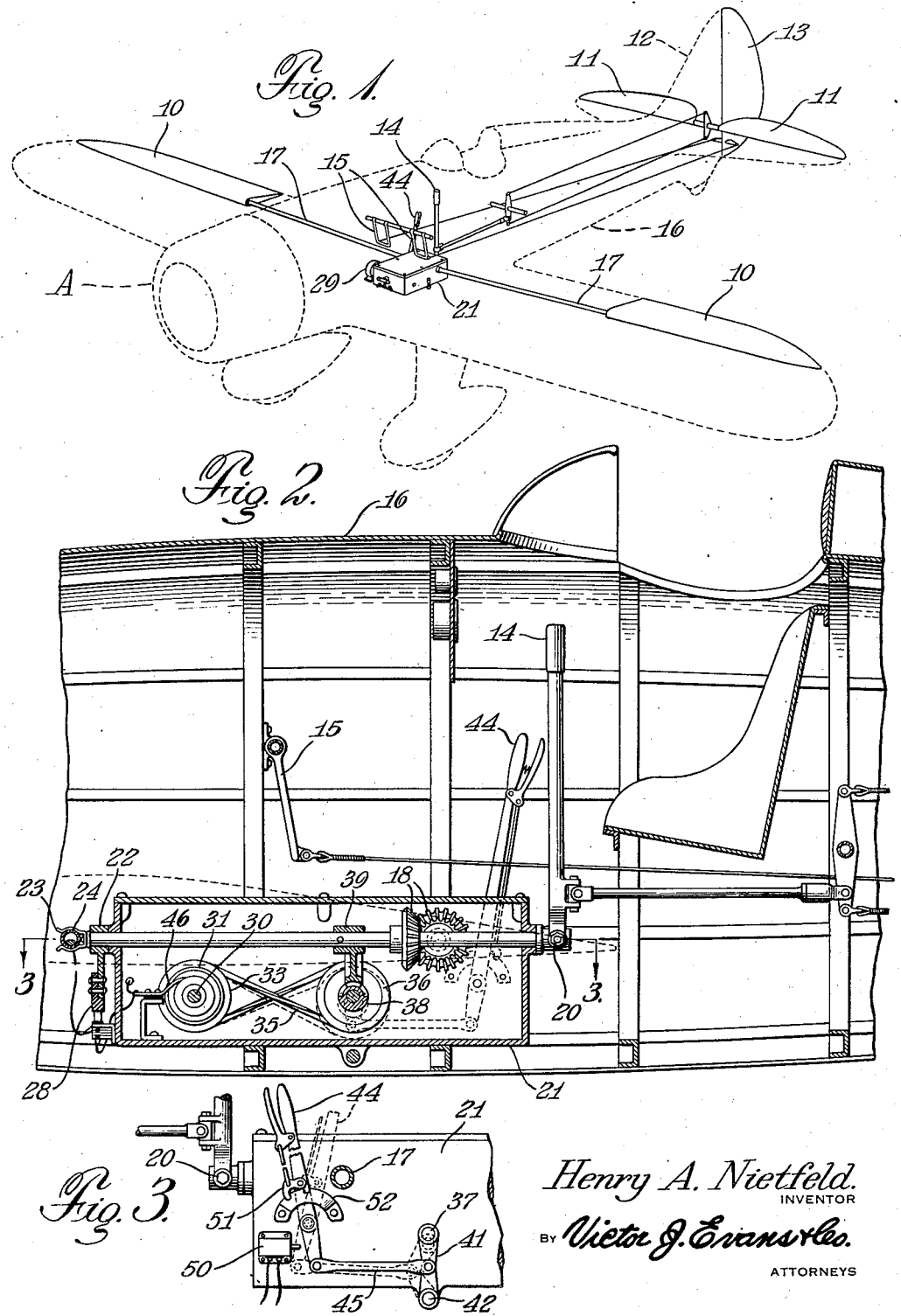
Henry A. Nietfeld.
INVENTOR
BY Victor J. Evans & Co.
ATTORNEYS Dec. 3, 1940.   H. A. NIETFELD   2,223,698
AUTOMATIC AIRPLANE WING CONTROL
Filed March 8, 1939   2 Sheets-Sheet 2
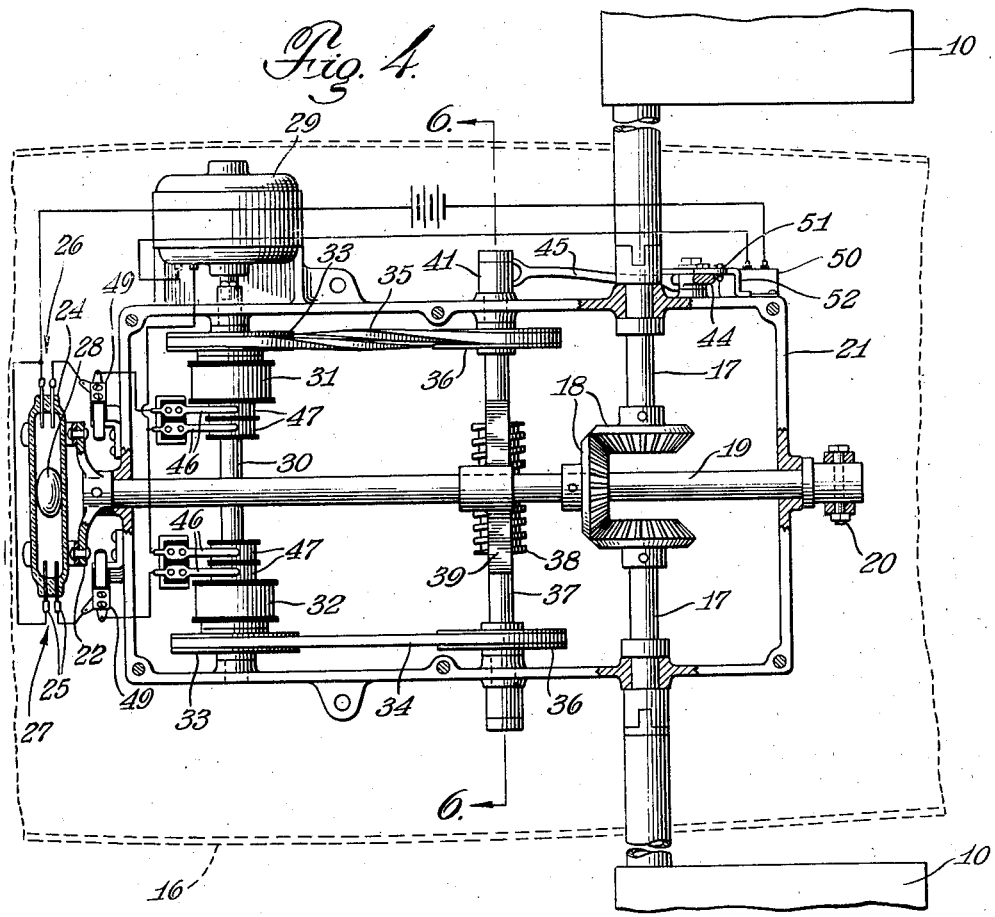
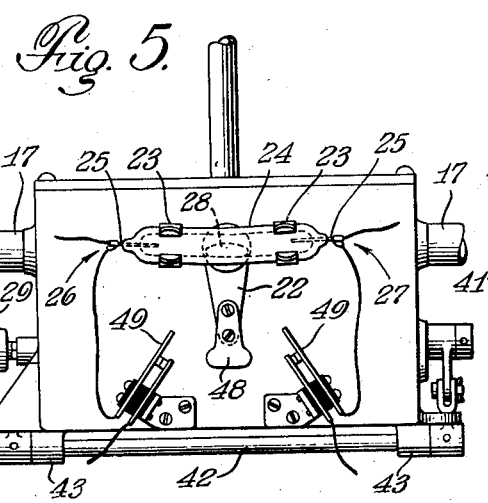
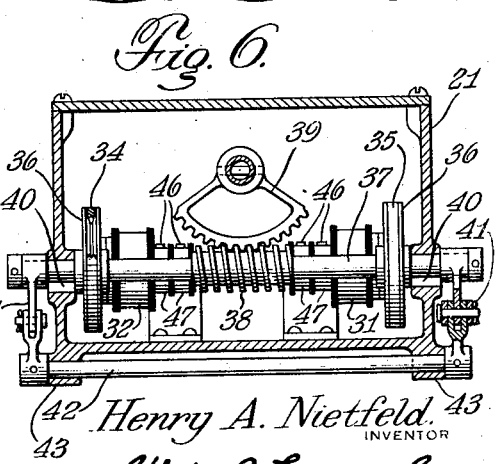
Henry A. Nietfeld, INVENTOR
BY Victor J. Evans & Co.
ATTORNEYS Patented Dec. 3, 1940

2,223,698

UNITED STATES PATENT OFFICE 2,223,698

AUTOMATIC AIRPLANE WING CONTROL

Henry A. Nietfeld, Marysville, Kans.

Application March 8, 1939, Serial No. 260,618

6 Claims. (Cl. 244—77)

The invention relates to an aircraft balancing appliance and more especially to the class of automatic wing control mechanism for airplanes.

The primary object of the invention is the provision of mechanism of this character, wherein the wings of aircraft structures can be manually or automatically pitched for maintaining the aircraft in correct flying stability or the bringing of the same to an even keel or balanced condition, beng adaptable for use in automatically stabilizing ships, air and water torpedoes, submarines or other movable objects.

Another object of the invention is the provision of mechanism of this character, wherein the automatic activity of the mechanism can be relieved from duty or set for activity and on inactivity or being relieved from duty the aircraft will be under manual control for stabilization in flight.

A further object of the invention is the provision of mechanism of this character, wherein the same in part is electric and in part mechanical.

A still further object of the invention is the provision of mechanism of this character, wherein safety cutout means is provided for preventing operation of control surfaces beyond their maximum safety angle.

A still further object of the invention is the provision of mechanism of this character, wherein the same is susceptible of gravity operation to actuate a reversible automatic control for bringing an aircraft or other movable object into a balanced traveling condition.

A still further object of the invention is the provision of mechanism of this character, which is simple in its construction, thoroughly reliable and efficient in operation, automatic in the working and under control of an operator, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a diagrammatic perspective view showing by dotted lines an aircraft and by full lines the mechanism constructed in accordance with the invention.

Figure 2 is an enlarged fragmentary vertical longitudinal sectional view through the craft.

Figure 3 is a sectional view taken on the line 3—3 of Figure 2 looking in the direction of the arrows.

Figure 4 is a fragmentary horizontal sectional view.

Figure 5 is a fragmentary elevation.

Figure 6 is a reduced sectional view taken on the line 6—6 of Figure 4 looking in the direction of the arrows.

Similar reference characters indicate corresponding parts throughout the several views in the drawings.

Referring to the drawings in detail, A designates generally an aircraft equipped with ailerons 10, elevators or flippers 11, a vertical fin 12 and a rudder 13, respectively. This rudder serves as a means for turning or controlling the ship about its vertical or rudder axis while the stabilizer, as usual, controls the rotation of the ship about its lateral axis. The elevators or flippers are controlled, as usual, by a stick 14 while the rudder 13 is controllable from pedals 15, respectively. The ailerons at opposite sides of the fuselage 16 are vertically swingable through the medium of turning shafts 17, these through a train of meshing beveled gears 18 are rotated by a main shaft 19 so that the said ailerons operate reversely to each other in their vertical swing or turning operation. The stick 14 is pivoted to the main shaft 19 and is also susceptible of swinging movement, the mounting therebetween being indicated at 20.

The main shaft 19 is journaled within a housing or casing 21 fixed within the fuselage 16 and this shaft is at the longitudinal center axis of the aircraft, the shafts 17 being carried within the housing or casing which accommodates the gearing 18. The shaft 19 outside of the housing or casing 21 has fixed thereto a dependent arm 22 carrying through bracket formation clips 23 in which is arranged a mercurial switch tube 24 in opposite ends of which are arranged contacts or electrodes 25, these being included in separate circuits, generally indicated at 26 and 27, respectively, while movable within the tube 24 is the mercurial switch closing bead or globular 28 for alternately closing the said circuits 26 and 27. Within these circuits 26 and 27 is an electric motor 29, its driving shaft having connection with a power shaft 30 suitably journaled within the housing or casing 21 transversely thereof and fixedly carried by this shaft are solenoids or electric magnets 31 and 32, respectively, which are adjacent to loose belt wheels 33 over which are trained the belts 34 and 35, respectively, the latter being crossed, and such belts are also trained over belt wheels 36 fixed to a raising and lowering shaft 37 having a worm screw 38 meshing with a toothed worm screw sector 39 fixed to the said main shaft 19. This shaft 37 is floated in suitable clearances 40 in opposite sides of the housing or casing 21 and has break link leverage connection 41 with a releasing shaft 42 suitably journaled at 43. This shaft is under the control of a throw lever 44 having link connection 45 with the connections 41 so that on the swinging of the lever 44 in one direction the shaft 37 will be moved to bring its worm screw 38 in meshing engagement with the sector 39 and upon movement of the lever 44 in a reverse or another direction the worm screw 38 is relieved from meshing engagement with the sector 39.

The circuits 26 and 27 have included therein wipers or brushes 46, these being constantly engageable with current collecting rings 47, a part of the solenoids or electromagnets 31 and 32 so that on the closing of either of the circuits 26 or 27 the solenoids 31 or 32 will be energized for fixing the belt wheels 33 next thereto to the shaft 30 so that when the motor 29 is acted motion will be transferred from this shaft 30 to the shaft 17 carrying the ailerons 10 for automatic control thereof.

Included in the circuits 26 and 27 exteriorly of the housing or casing 21 in the path of movement of a dogging member 48 on the arm 22 are limit switches 49, these being open for the opening of the said circuits 26 and 27 when the ailerons 10 have swung too far or beyond safety position.

Included in the said circuits 26 and 27 is a cutout switch 50 disposed in the path of movement of the throw lever 44 so that when the latter is swung in one direction the switch 50 will be operated for the opening of the said circuits, the said switch 50 being normally in closed position when the lever 44 is disposed out of action thereon. This lever 44 when manually operated enables the cutting out of the automatic control mechanism hereinbefore described as well as disconnecting the worm screw 38 from the sector 39, which assures inactivity of said automatic control mechanism.

When the automatic control mechanism is cut out from duty, the ailerons 10 are under manual control of the operator of the craft through the controls 14 and 15. When it is desired to have the automatic control active or on duty, the operator of the craft shifts the lever 44 to a position for the closing of the switch 50 and the engagement of the worm screw 38 with the sector 39. In this condition the lateral swing of the craft from an even keel causes the mercurial switch to become active so that the ailerons 10 will be automatically adjusted to bring the said craft to a balanced flight condition without requiring the operator of the machine to bring into action any manual control of such ship. The limit switches 49 in cooperation with the dogging member 48 assure the proper operation of the ailerons under the automatic control for the same and thus safety in the travel of the ship is assured with the resultant balancing condition thereto in flight. The throw lever 44 is equipped with a spring tensioned hand operated latch 51 coacting with a keeper sector 52 so that the said throw lever 44 can be held in shifted or adjusted positions.

The motor 29 becomes active when either of the circuits 26 or 27 be completely closed, the switches 49 being normally in closing position and the switch 50 is in closing position when the automatic control is set for duty or operation.

What is claimed is:

1. A control for a craft having swingable ailerons, comprising a shaft having gear connections with the ailerons for imparting reverse motion thereto, a dependent arm on said shaft, a toothed segment carried by said shaft, a driven shaft movable toward and away from the said segment and having a worm screw for connection with the segment, an electric motor having a driving shaft, driven connections between the driving shaft and said worm screw shaft, an electric circuit having the motor arranged therein, electromagnets on said driving shaft for releasably fixing the driven connections thereto and included in said circuit, and a mercurial switch arranged in said circuit and connected with said first-mentioned shaft for gravity action therewith and adapted to alternately open and close the said circuit and arranged for cooperation with the first-mentioned shaft for automatic opening and closing operation through gravity action of said first-mentioned shaft.

2. A control for a craft having swingable ailerons, comprising a shaft having gear connections with the ailerons for imparting reverse motion thereto, a dependent arm on said shaft, a toothed segment carried by said shaft, a driven shaft movable toward and away from the said segment and having a worm screw for connection with the segment, an electric motor having a driving shaft, driven connections between the driving shaft and said worm screw shaft, an electric circuit having the motor arranged therein, electromagnets on said driving shaft for releasably fixing the driven connections thereto and included in said circuit, a mercurial switch arranged in said circuit and connected with said first-mentioned shaft for gravity action therewith and adapted to alternately open and close the said circuit and arranged for cooperation with the first-mentioned shaft for automatic opening and closing operation through gravity action of said first-mentioned shaft, and manually operated means for shifting the worm screw shaft into and out of engagement with the toothed segments.

3. A control for a craft having swingable ailerons, comprising a shaft having gear connections with the ailerons for imparting reverse motion thereto, a dependent arm on said shaft, a toothed segment carried by said shaft, a driven shaft movable toward and away from the said segment and having a worm screw for connection with the segment, an electric motor having a driving shaft, driven connections between the driving shaft and said worm screw shaft, an electric circuit having the motor arranged therein, electromagnets on said driving shaft for releasably fixing the driven connections thereto and included in said circuit, a mercurial switch arranged in said circuit and connected with said first-mentioned shaft for gravity action therewith and adapted to alternately open and close the said circuit and arranged for cooperation with the first-mentioned shaft for automatic opening and closing operation through gravity action of said first-mentioned shaft, manually operated means for shifting the worm screw shaft into and out of engagement with the toothed segments, and a striking dog fitted to the dependent arm in the path of the limit switches for alternate engagement therewith.

4. A control for a craft having swingable ailerons, comprising a shaft having gear connections with the ailerons for imparting reverse motion thereto, a dependent arm on said shaft, a toothed segment carried by said shaft, a driven shaft movable toward and away from the said segment and having a worm screw for connection with the segment, an electric motor having a driving shaft, driven connections between the driving shaft and said worm screw shaft, an electric circuit having the motor arranged therein, electromagnets on said driving shaft for releasably fixing the driven connections thereto and included in said circuit, a mercurial switch arranged in said circuit and connected with said first-mentioned shaft for gravity action therewith and adapted to alternately open and close the said circuit and arranged for cooperation with the first-mentioned shaft for automatic opening and closing operation through gravity action of said first-mentioned shaft, manually operated means for shifting the worm screw shaft into and out of engagement with the toothed segments, a striking dog fitted to the dependent arm in the path of the limit switches for alternate engagement therewith, and means for releasably clipping the mercurial switch to the first-mentioned shaft and located at the dependent arm.

5. A control for a craft having swingable ailerons, comprising a shaft having gear connections with the ailerons for imparting reverse motion thereto, a dependent arm on said shaft, a toothed segment carried by said shaft, a driven shaft movable toward and away from the said segment and having a worm screw for connection with the segment, an electric motor having a driving shaft, driven connections between the driving shaft and said worm screw shaft, an electric circuit having the motor arranged therein, electromagnets on said driving shaft for releasably fixing the driven connections thereto and included in said circuit, a mercurial switch arranged in said circuit and connected with said first-mentioned shaft for gravity action therewith and adapted to alternately open and close the said circuit and arranged for cooperation with the first-mentioned shaft for automatic opening and closing operation through gravity action of said first-mentioned shaft, manually operated means for shifting the worm screw shaft into and out of engagement with the toothed segments, a striking dog fitted to the dependent arm in the path of the limit switches for alternate engagement therewith, means for releasably clipping the mercurial switch to the first-mentioned shaft and located at the dependent arm, and a hand-operated switch arranged in said circuit.

6. A control for a craft having swingable ailerons, comprising a shaft having gear connections with the ailerons for imparting reverse motion thereto, a dependent arm on said shaft, a toothed segment carried by said shaft, a driven shaft movable toward and away from the said segment and having a worm screw for connection with the segment, an electric motor having a driving shaft, driven connections between the driving shaft and said worm screw shaft, an electric circuit having the motor arranged therein, electromagnets on said driving shaft for releasably fixing the driven connections thereto and included in said circuit, a mercurial switch arranged in said circuit and connected with said first-mentioned shaft for gravity action therewith and adapted to alternately open and close the said circuit and arranged for cooperation with the first-mentioned shaft for automatic opening and closing operation through gravity action of said first-mentioned shaft, manually operated means for shifting the worm screw shaft into and out of engagement with the toothed segments, a striking dog fitted to the dependent arm in the path of the limit switches for alternate engagement therewith, means for releasably clipping the mercurial switch to the first-mentioned shaft and located at the dependent arm, a hand-operated switch arranged in said circuit, and a control stick connected with the first-mentioned shaft and having the last-mentioned switch in close proximity thereto.

HENRY A. NIETFELD.